Patented Jan. 20, 1942

2,270,643

UNITED STATES PATENT OFFICE 2,270,643

PROCESS FOR THE PRODUCTION OF NICKEL AND COBALT ALLOYS BY ALUMINOTHERMIC REDUCTION

Max Stern, Kew Gardens, N. Y.

No Drawing. Application March 20, 1941,
Serial No. 384,360

3 Claims. (Cl. 75—27)

The invention relates to a method of utilizing the aluminum contents of aluminum containing alloys for the production of metals and alloys by aluminothermic reduction.

In the performance of this type reduction methods the initial oxidic materials and the reducing metal are mixed in a finely divided state. The mixture is ignited and during the ensuing intense reaction the oxidic materials are reduced to metals whereas the aluminum powder is converted into alumina which in the form of a slag accumulates on the surface of the metallic bath. The aluminum required for the reduction is calculated slightly in excess over the stoichiometric ratio.

It is an object of the invention to produce metals and metal alloys in an essentially pure state by the application of alloys as a reduction material of which aluminum is an alloy component.

It is a further object of the invention to modify the customary aluminothermic method of reducing metallurgical oxidic products for instance metal oxides, oxidic ores, oxidic dross and waste and other by-products by the application of aluminum in a molten state.

Another object of the invention is to utilize for the aluminothermic reaction the aluminum component of certain metal alloys wherein the aluminum due to the complex constitution of the alloy is an objectionable burden.

It is a further object of the invention to employ for aluminothermic reduction processes aluminum containing alloys which due to their complex constitution connot even be utilized as scrap for remelting or refining purposes.

Still an object of the invention is to provide a practically continuous aluminothermic process for the manufacture of the metals and metal alloys from oxidic metallurgical materials.

In accordance with this invention an aluminum containing alloy e. g. an alloy of the Alnico type containing aluminum, cobalt, nickel and iron is employed in its molten state for the performance of the aluminothermic reduction process. Aluminum alloys with other metals for instance chromium and the metals of the chromium group may be advantageously used.

In accordance with the invention the aluminum of these aluminum containing alloys of which the utilization is practically prevented by the presence of the aluminum is removed as oxide; the other alloy components are recovered and by the reduction of additional oxidic compounds for instance cheap oxidic ores through the oxidized aluminum new alloys are produced of which the percentage of the original alloy components is enlarged or into which new components are introduced.

With this purpose in view alloys of which the aluminum is an unwelcome component e. g. alloys of the Alnico type containing nickel and cobalt besides aluminum are molten in a crucible or any other furnace which may be advantageously used for an aluminothermic reduction. The aluminum containing alloy may also be melted in a ladle and may be poured into a suitable reaction vessel.

The oxidic materials, oxidic ores and other oxidic metallurgical products are now added to the molten alloy, whereupon an intense reducing reaction ensues. In this manner oxides of nickel, cobalt, chromium, vanadium, molybdenum, titanium and the like metals may be reduced to metals by the utilization of the unwelcome and burdensome aluminum component of metal alloys.

It is of course possible to simultaneously reduce several metal oxides. Nickel and chromium containing mill scale may also be advantageously utilized in my process.

As already pointed out previously the aluminum which is an unwelcome and practically useless component of certain nickel, cobalt, chromium, vanadium, titanium, tungsten and similar metals containing alloys as it interferes with the recovery of these metals by customary melting or leaching processes is utilized according to the invention in a surprisingly efficient and useful manner and separated from these metals which at the same time are enriched by the reduction of oxidic compounds and products of the same or of other metals. The further important advantage is gained that the costs of converting the aluminum into a fine division generally needed for the performance of aluminothermic reduction methods are saved.

In order to increase the speed of the reaction the oxidic materials to be reduced may be heated or even melted before they are added to the molten aluminum containing alloy.

Since the aluminothermic reaction is strongly exothermic the temperature of the bath is considerably increased. The increased tempearture may be utilized to melt further quantities of the aluminum containing alloy. As soon as the added aluminum containing alloy is melted a corresponding amount of oxidic products and particularly metal oxide may be added which is now reduced by the aluminum metal. The addition of the aluminum containing alloy and of oxidic materials e. g. metal oxide to the bath may be repeated at a decreasing rate until the losses of heat by radiation and by melting added quantities of the initial alloy outbalance the increase of temperature produced by the reaction between the aluminum and the metal oxide.

It is obvious that many metals and alloys may be produced from certain aluminum containing alloys in this manner by adding the desired metal in oxidic form.

As previously stated the aluminum of many alloys, for instance alloys of the Alnico type, is practically useless because it cannot be economically recovered from the alloy. My novel process which makes it possible to utilize this aluminum which not alone is a valueless but an obnoxious component of the alloys, to separate it from the other alloy components and to produce by the introduction of metal oxides or cheap oxidic ores aluminum free alloys of which the percentage of other components in comparison to the initial alloy is increased or from which new alloys are formed, signifies a decided progress in the art.

Example 1000 kg. of an alloy consisting of 14% Al, 5% Co, 20% Ni, remainder Fe is melted in a suitable furnace. The melted alloy is poured into a ladle. The temperature of the melted alloy in the ladle is 1500° C. 580 kg. nickel oxide are gradually added to the molten alloy. A vehement reaction results whereby the nickel is reduced and the aluminum is converted into aluminum oxide. The temperature of the bath is increased by the reaction to above 2800° C.

The thus produced heat suffices to melt a further batch of 1000 kg. of the aluminum containing alloy. When these 1000 kg. of the alloy have been added to the bath the temperature thereof is reduced to about 1500° C. Then a further amount of nickel oxide may be added to the bath for reduction.

The process can be continued by further addition of the aluminum containing alloy and of nickel oxide until the losses of heat by melting the added materials and by radiation outbalance the heat produced by the reaction between the aluminum and the nickel oxide.

When this point is reached, the process is discontinued and the formed alloy may be withdrawn from the ladle. This alloy is free from aluminum which is contained in the slag as alumina.

I claim:

1. A process for the production of nickel and cobalt alloys by aluminothermic reduction comprising adding to a molten cobalt, nickel, aluminum and iron alloy of the Alnico type at least one substance selected from the group consisting of nickel and cobalt oxide reducing by reaction with the aluminum the said substances to metals, separating the formed alumina as a slag and obtaining an aluminum free alloy consisting of the contents of nickel, cobalt and iron in the initial alloy and the metals produced by the aluminothermic reduction of the added oxides.

2. A process for the production of nickel and cobalt alloys by aluminothermic reduction comprising preheating at least one substance selected from the group consisting of nickel and cobalt oxide, adding the preheated substance to a molten cobalt, nickel, aluminum and iron alloy of the Alnico type, reducing said substances to metals by reaction with the aluminum contained in the alloy, separating the formed alumina as a slag, and obtaining an aluminum free alloy consisting of the contents of nickel, cobalt and iron in the initial alloy and of the metals produced by the aluminothermic reduction of the added oxides.

3. A process for the production of nickel and cobalt alloys by aluminothermic reduction comprising introducing oxidic metallurgical materials into a molten initial cobalt, nickel, aluminum and iron alloy of the Alnico type, reducing the oxidic metallurgical materials to metals by reaction with the aluminum contained in the alloy, adding a new quantity of the initial alloy and melting it by the heat produced by the aluminothermic reaction, adding a new quantity of the oxidic materials for reaction with the aluminum contained in the added initial alloy, and continuing this procedure until the losses of heat by melting the added materials and by heat radiation balance the heat produced by the reduction of the newly added oxidic materials.

MAX STERN.